United States Patent
Erlendsson et al.

(10) Patent No.: US 9,499,938 B2
(45) Date of Patent: Nov. 22, 2016

(54) MECHANICAL METHOD FOR CREATION OF A SPLICE IN A COVERBRAIDED ROPE AND PRODUCTS

(71) Applicants: Hjortur Erlendsson, Kopavogur (IS); Sherif Adham Safwat, Bainbridge Island, WA (US)

(72) Inventors: Hjortur Erlendsson, Kopavogur (IS); Sherif Adham Safwat, Bainbridge Island, WA (US)

(73) Assignee: Hampidjan hf, Reykjavik (IS)

( * ) Notice: Subject to any disclaimer, the term of this patent is extended or adjusted under 35 U.S.C. 154(b) by 162 days.

(21) Appl. No.: 14/203,127

(22) Filed: Mar. 10, 2014

(65) Prior Publication Data

US 2014/0345183 A1    Nov. 27, 2014

Related U.S. Application Data

(63) Continuation of application No. 13/901,657, filed on May 24, 2013, now Pat. No. 8,695,317.

(51) Int. Cl.

| | |
|---|---|
| *D07B 1/18* | (2006.01) |
| *D07B 5/00* | (2006.01) |
| *A01K 75/00* | (2006.01) |
| *D07B 1/16* | (2006.01) |
| *D07B 5/12* | (2006.01) |
| *A01K 73/02* | (2006.01) |
| *D07B 3/00* | (2006.01) |
| *D07B 1/02* | (2006.01) |
| *D07B 1/14* | (2006.01) |

(52) U.S. Cl.
CPC ............... *D07B 1/185* (2013.01); *A01K 73/02* (2013.01); *A01K 75/00* (2013.01); *D07B 1/165* (2013.01); *D07B 3/00* (2013.01); *D07B 5/00* (2013.01); *D07B 5/005* (2013.01); *D07B 5/12* (2013.01); *D07B 1/02* (2013.01); *D07B 1/025* (2013.01); *D07B 1/142* (2013.01); *D07B 2201/1096* (2013.01); *D07B 2201/2049* (2013.01); *D07B 2201/2055* (2013.01); *D07B 2201/2066* (2013.01); *D07B 2201/2068* (2013.01); *D07B 2205/201* (2013.01); *D07B 2205/2003* (2013.01); *D07B 2205/2014* (2013.01); *D07B 2205/2039* (2013.01); *D07B 2205/2064* (2013.01); *D07B 2207/4054* (2013.01); *D07B 2207/4068* (2013.01); *D07B 2401/205* (2013.01); *D07B 2501/2038* (2013.01); *D07B 2501/2061* (2013.01)

(58) Field of Classification Search
CPC ............ D07B 1/12; D07B 1/14; D07B 1/16; D07B 1/165; D07B 1/18; D07B 1/185; D07B 7/14; D07B 7/16; D07B 7/169; D07B 7/18; D07B 7/185; D04C 1/12; B65H 81/06

See application file for complete search history.

(56) References Cited

U.S. PATENT DOCUMENTS

| | | | |
|---|---|---|---|
| 1,658,434 | A | 1/1928 | Farrell |
| 2,096,606 | A | 10/1937 | Buhler |
| 2,107,661 | A | 2/1938 | Crossley |
| 2,587,117 | A | 2/1952 | Clay |

(Continued)

FOREIGN PATENT DOCUMENTS

| | | |
|---|---|---|
| FR | 438.605 | 5/1912 |
| FR | 1.248.116 | 10/1960 |
| WO | WO 01/35729 | 5/2001 |

*Primary Examiner* — Shaun R Hurley
(74) *Attorney, Agent, or Firm* — Donald E. Schreiber (57) ABSTRACT

Methods are provided for forming a spliced eye (220) of a sling (222) made from a rope that includes a core rope (37) and includes a braided sheath (398).

34 Claims, 3 Drawing Sheets

Step Seven

(56) References Cited

U.S. PATENT DOCUMENTS

| | | |
|---|---|---|
| 3,344,699 A | 10/1967 | Ohno |
| 3,975,980 A | 8/1976 | Hood |
| 3,991,550 A | 11/1976 | Cohen |
| 4,228,641 A | 10/1980 | O'Neil |
| 4,240,486 A | 12/1980 | Schmit et al. |
| 5,152,130 A | 10/1992 | McGrew |
| 5,473,877 A | 12/1995 | Hamacher |
| 5,572,860 A | 11/1996 | Mitsumoto et al. |
| 5,988,101 A * | 11/1999 | Jacobs ............... A62B 3/00 116/202 |
| 6,357,164 B1 | 3/2002 | Safwat et al. |
| 6,374,531 B1 | 4/2002 | Safwat et al. |
| 6,732,468 B2 | 5/2004 | Safwat et al. |
| 7,147,904 B1 | 12/2006 | Crawford |
| 2003/0093938 A1 | 5/2003 | Safwat et al. |
| 2004/0002272 A1 | 1/2004 | Land |
| 2004/0200120 A1 | 10/2004 | Safwat et al. |
| 2005/0160656 A1 | 7/2005 | Safwat et al. |
| 2006/0272196 A1 | 12/2006 | Safwat et al. |
| 2007/0079483 A1 | 4/2007 | Gunnarsson |
| 2010/0162882 A1* | 7/2010 | Shakespeare ........... A62B 1/16 87/6 |
| 2011/0061519 A1* | 3/2011 | Fields ................... A63B 29/02 87/2 |
| 2011/0110633 A1 | 5/2011 | Erlendsson |

* cited by examiner

MECHANICAL METHOD FOR CREATION OF A SPLICE IN A COVERBRAIDED ROPE AND PRODUCTS

TECHNICAL FIELD

The present disclosure relates generally to the technical field of ropes and more particularly to ropes used in forming pelagic mesh in pelagic trawls where such ropes are formed from a strength member core surrounded by a braided sheath wherein the braided sheath is formed of several strands and one of the strands is significantly larger than the other strands so as to form a series of cambered sections capable of either or both causing lift and reducing drag when such rope is subjected to water flow about the rope in a position that corresponds to a position assumed by ropes used in forming pelagic trawl mesh in pelagic trawls. Such ropes are known as "helix ropes".

BACKGROUND ART

Pelagic trawls include trawls used to catch Alaska Pollock, blue whiting, capelin, herring, mackerel, pearlside, hoki, hake and other fish species. Pelagic trawls have their pelagic mesh formed mainly of ropes. Pelagic mesh in a pelagic trawl is mesh having a mesh size that is four meters (4 m) and greater. A main problem in the pelagic trawl fishing industry and the pelagic trawl net manufacturing industry is high operational costs minimizing profitability. Price competition is severe and thus high cost and high quality ropes such as ropes used in climbing applications, yachting applications and seismic applications, to name a few are not feasible for use in forming the pelagic mesh of pelagic trawls because the pelagic mesh are constantly damaged and replaced, and require replacement even when not damaged as they are made as thin and as light as possible in order to minimize drag and concurrent fuel consumption, and thus are worked at high loads relative to break points and therefore fail rather quickly. For this reason, more costly coverbraided (including "overbraided") ropes, as opposed to braid jacketed twines used in small mesh netting of say lesser than six hundred millimeters (600 mm), are not favored for forming the pelagic mesh of pelagic trawls. Indeed, considering the world wide pelagic trawl industry as a whole, it is a fact that it is contrary to the state of the art and against the trend in the industry to design and form the pelagic mesh portion of pelagic trawls from coverbraided ropes.

Due to the severe price competition, presently the vast majority of pelagic trawls have their pelagic mesh portion formed of non-jacketed braided or twisted twines. These are low cost to produce, low cost to replace, and easy to splice. It is important that the ropes be easy to splice as splicing has become the dominant form of connecting front part mesh in pelagic trawls as it is much stronger than knotting and also much lower in drug than knotting, allowing much lowered manufacture costs as well as lowered drag and concurrent lowered fuel consumption. The difficulty in splicing coverbraided ropes and especially in splicing tightly coverbraided ropes such as helix ropes is another reason that coverbraided ropes have lost favor among pelagic trawl manufacturers and end users.

One of the main problems caused by the fact that coverbraided ropes are largely out of favor in forming the pelagic mesh portion of pelagic trawls is that the most easily handled and in fact the preferred variant of self spreading meshed trawls employ a coverbraid in the self spreading rope construction and it is self spreading trawls that have the lowest environmental impact of all pelagic trawl constructions. Thus, it is important to increase market demand for self spreading trawls in order to increase the use of low environmental impact pelagic trawls. Ultimately, it is catch per unit effort that is most important to fishing company customers, so newer and better self spreading rope constructions for self spreading trawls must better some factor that the bettering of which improves the catch per unit effort. Likewise, if market demand is to be increased for such self spreading trawls that is pelagic trawls that have the lowest environmental impact of any type of pelagic trawl, such self spreading trawls must increase the catch per unit effort.

The main factor in improving catch per unit effort of pelagic trawls at the rope level is to reduce the drag of a rope at angles of attack found in the pelagic netting portions of pelagic trawls and consequently the drag of a pelagic trawl. The reduced drag concurrently reduces fuel consumption, and also can increase trawl opening. Either or both lead to increased catch per unit effort, and thus lead to increased customer acceptance and demand.

Helix ropes, as defined above and also further defined herein, are used in self spreading pelagic trawls known as "Helix Trawls" manufactured and sold by Hampidjan HF of Iceland. The original teaching of such helix ropes is contained within now Published Patent Cooperation Treaty (PCT) International Publication No. WO/1998/046070. International Application No. PCT/US1998/007848 (see FIG. 29), and a latter teaching of such helix ropes also is contained within now Published Patent Cooperation Treaty (PCT) International Publication No. WO 03/081989 A2, International Application No. PCT/US03/10114 (see FIG. 6). Helix ropes, and the "Helix Trawls" manufactured by Hampidjan HF of Iceland, have acquired a reputation of exhibiting excessively greater drag than modern, state of the art cordage used to form other pelagic trawl nets and especially non-self spreading pelagic trawl nets in the present state of the art. The increased drag concurrently results in smaller trawl openings, reduced towing speed and increase fuel consumption at given tow speeds. For this reason the use of helix ropes to form self spreading trawls such as Helix Trawls has lost favor among fishing entities, despite the fact that they offer other favorable properties, such as eliminating by-catch of marine mammals that would otherwise be caught in non-self spreading trawls when the back end of such non-self spreading trawls collapses around and the marine mammals, enhanced ability to selectively fish as the trawls do not collapse, and other. Problematically, it is the helix ropes that also are the preferred form of a self spreading rope for forming a self spreading pelagic trawl because they are the most reliable embodiment of a self spreading rope useful for forming a self spreading pelagic trawl, other embodiments having lost favor and no longer being in use.

Beyond the highly favorable environmental factors of helix rope formed pelagic trawls, there are other instances when helix rope formed pelagic trawls are highly useful. These include in slow trawl speed applications, and in quick turning applications at deep depths with much warp out, as in these circumstances the self spreading properties of self spreading trawls prevents the trawls from collapsing, thereby not only preventing by-catch of marine mammals and enhancing selective fishing, but also maintaining the trawl fishing the selected species for greater portion of the time. So, where such operational conditions prevail it is favorable to the final catch per unit effort equation to employ even the presently known higher drag and higher cost self spreading trawls formed of the helix rope. However, these circumstances are not the norm, but rather the exception, and in such cases the greater fuel consumption of such trawls is not favored, but rather tolerated and it remains that lowering drag and concurrently lowering fuel consumption is a most important factor in increasing customer demand for such environmentally positive trawls.

Thus, it can readily be appreciated that it is important to reduce the drag of helix ropes so as to reduce the drag of pelagic trawls formed of such helix ropes in order to once again generate favor among fishing entities to use the low environmental impact self spreading trawls that also greatly enhance marine mammal safety and permit more selective fishing, while concurrently reducing fuel consumption per unit of fish caught.

To further describe a helix rope: a helix rope is a type of a "coverbraided" rope, the term "coverbraided" rope also known herein and in the industry as "overbraided" rope. The cover or sheath is formed by a braided sheath that is itself formed of strands. What distinguishes a helix rope from any other type of tightly coverbraided rope useful in forming pelagic mesh in pelagic trawls is that in a helix rope one of the strands forming the braided sheath is substantially larger than the other strands forming the braided sheath. The state and trend of the art in forming any helix rope for the commercial pelagic trawl net industry is to form the braided sheath with the minimum needed count (i.e. quantity) of strands, in order to minimize manufacture costs. That is, the greater the count of strands forming the braided sheath beyond a certain quantity, the greater the manufacture cost. One reason for this is that braiding machinery carrier counts typically are available in eight carriers for more affordable braiding machinery, and sixteen carriers for more expensive braiding machinery. The braiding machinery that forms the braided sheath is progressively more expensive the more carriers that must exist, it being known to those skilled in the art that each carrier provides the material for one of the sheath's strands. As inferred above, due to extreme price competition in the commercial pelagic trawl fish net manufacturing industry, including the manufacturing of components for such commercial pelagic trawl fish nets, helix ropes being one possible such component, pelagic trawl makers as well as manufacturers of components for pelagic trawls acquire and use the least expensive components, methods and machinery for manufacturing such components and pelagic trawls as the customers shall accept, and today most customers are unwilling to pay for a coverbraided rope used to form the front part netting portion of a pelagic trawl.

In fact, as mentioned supra, it is safe to say worldwide that coverbraided ropes are not favored for forming the front part netting portion of pelagic trawls, and that they are constantly loosing favor more and more. Furthermore, due to the fact that as strand count in the braided sheath of any coverbraided rope increases the cost of such rope also progressively increases, it is safe to say that no pelagic trawl manufacturer or even a manufacturer of ropes for sale for use in forming the pelagic mesh portions of pelagic trawls would have any incentive whatsoever to form a braided sheath of any coverbraided rope intended for use in forming pelagic mesh portions of pelagic trawls from any other than a minimum carrier count required for customer acceptance. Thus, with helix ropes having lost favor for use in forming front part netting portions of pelagic trawls due to greater costs, and because the greater the strand count the greater the cost, and as the greatest strand count that ever has been used in any helix rope's braided sheath is sixteen strands, it is safe to say that it is absolutely contrary to the state of the art and against the trend in the industry for any one either to make or believe there is any reason or benefit to be obtained by forming a helix rope with greater than sixteen strands in its coverbraided sheath.

In fact, due to extreme price competition, some rope makers are forming helix ropes with lesser strand counts than are normally deemed by others as adequate for the purpose of rigidity for ease of handling.

It is widely held in the art that very smoothed surface ropes have the greatest drag. In fact, the most popular and widely adopted ropes used for forming the front part portions of pelagic trawls have roughened surfaces, such as conventional twisted and hollow braided non-coverbraided ropes. As taught in the European Patent, it is preferable that the surface of the helix rope's braided sheath be a somewhat roughened surface. Thus, because increasing the strand count progressively decreases surface roughness, and as existing helix ropes' braided sheaths already are considered by those skilled in the art to have a very smooth surface, it can readily be appreciated that there is no hint or suggestion to those skilled in the art to increase the strand count of the helix rope's braided sheath in any attempt to improve drag properties.

Furthermore, known strand counts in braided sheaths in known helix ropes are already considered entirely adequate and even ideal when measured by industry standards and the state of the art and trend in the industry of aesthetic appearance, abrasion resistance, ease of handling and surface smoothness affecting drag. Thus, not only is there great disincentive to those skilled in the art to employ more than minimal known strand counts in forming the coverbraid of any helix rope used in forming any portion of a pelagic trawl net, there also is no positive incentive. In fact there is only the disincentive of extreme price competition that would punish any pelagic trawl component maker or pelagic trawl maker who would make a helix rope or other coverbraided rope for the commercial pelagic trawl fish net industry where such helix rope or other coverbraided rope would have greater than a minimum required count of strands according to industry norms for determining what is suitable for forming the braided sheath of a helix rope, those determinants of industry norms mentioned above and herein.

Because known helix ropes have sheaths that already are considered by industry norms to be suitably abrasion resistant, have ideal aesthetic appearance, optimal rigidity for ease of handling and suitable smoothness, it can readily be appreciated that not only is there great disincentive, no positive incentive, but also there exists no hint or suggestion to those skilled in the art to increase the strand count of the braided sheath of any helix rope beyond known strand counts for forming known helix ropes.

Thus, it can readily again be appreciated that the present state of the art as well as the present trend in the industry teaches one skilled in the art away from using greater than sixteen (16) strands for forming the braided sheath of a helix rope useful for forming the pelagic mesh of a pelagic trawl net.

It is also worthwhile to note that the present state of the art and the current trend in the industry is to form ropes for forming pelagic trawl mesh in such a fashion that all portions of the rope maximally contribute to the overall strength of the rope.

DISCLOSURE

It is an object of the present disclosure to provide for a helix rope and process for forming and using such that is useful for forming pelagic mesh in pelagic trawls that has lesser drag when subjected to water flow at trawl mesh angles of attack than known helix ropes.

Another object of the present disclosure is to provide for a helix rope and process for forming and using such that is useful for forming pelagic mesh in pelagic trawls and that is stronger than known constructions of helix rope.

Disclosed is a construction for a helix rope and process for forming such having lesser drag when subjected to water flow than known helix rope constructions. Most broadly the construction of the helix rope of the present disclosure includes greater than sixteen strands forming the braided sheath that forms the coverbraid about the strength member core product strand.

Further disclosed is a construction of a helix rope and process for forming such having greater strength than known constructions of helix rope. Most broadly such construction of a helix rope of the present disclosure includes a helixing strand included within the strands forming that braided sheath or situated without the strands forming the braided sheath where such helixing strand is both larger in diameter than other strands forming the braided sheath and also is more elastic than other strands forming the braided sheath. In one embodiment, the more elastic helixing strand is a braided construction, and in another embodiment it is a monofilament of a material including polyurethane or the like.

Possessing the preceding advantages, the methods, processes and constructions of helix ropes of the present disclosure answers needs long felt in the industry.

These and other features, objects and advantages are likely to be understood or apparent to those of ordinary skill in the art from the following detailed description of the preferred embodiment as illustrated in the various drawing figures.

BEST MODE FOR CARRYING OUT THE DISCLOSURE

Figure 1:
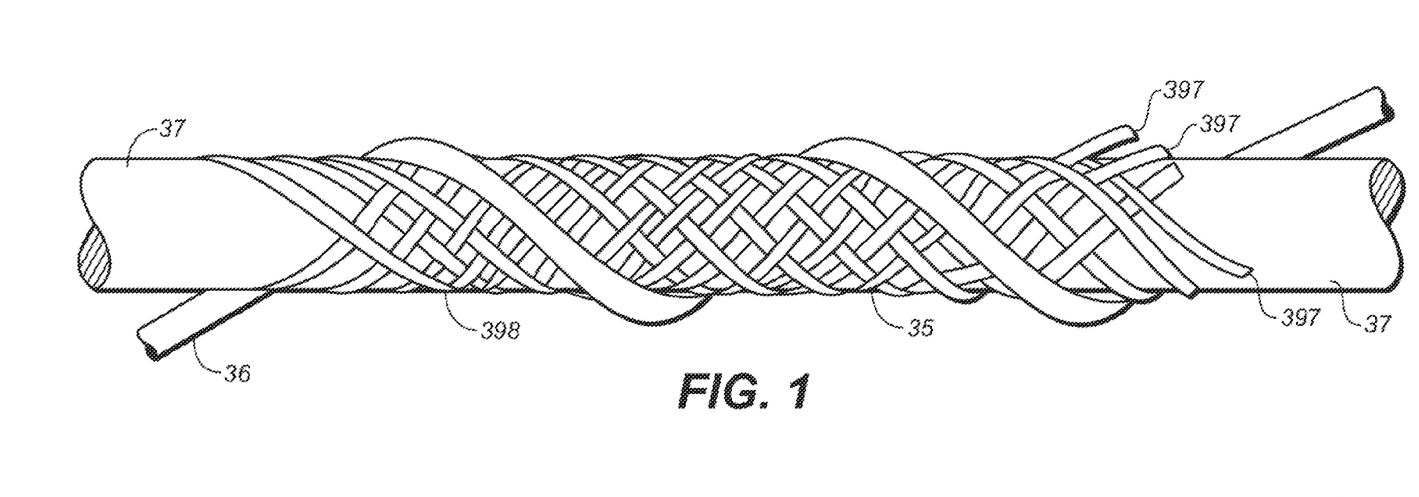
FIG. 1 is a plan view of a helix rope in accordance with the present disclosure that reveals various layers included in one embodiment thereof.
Figure 1A:
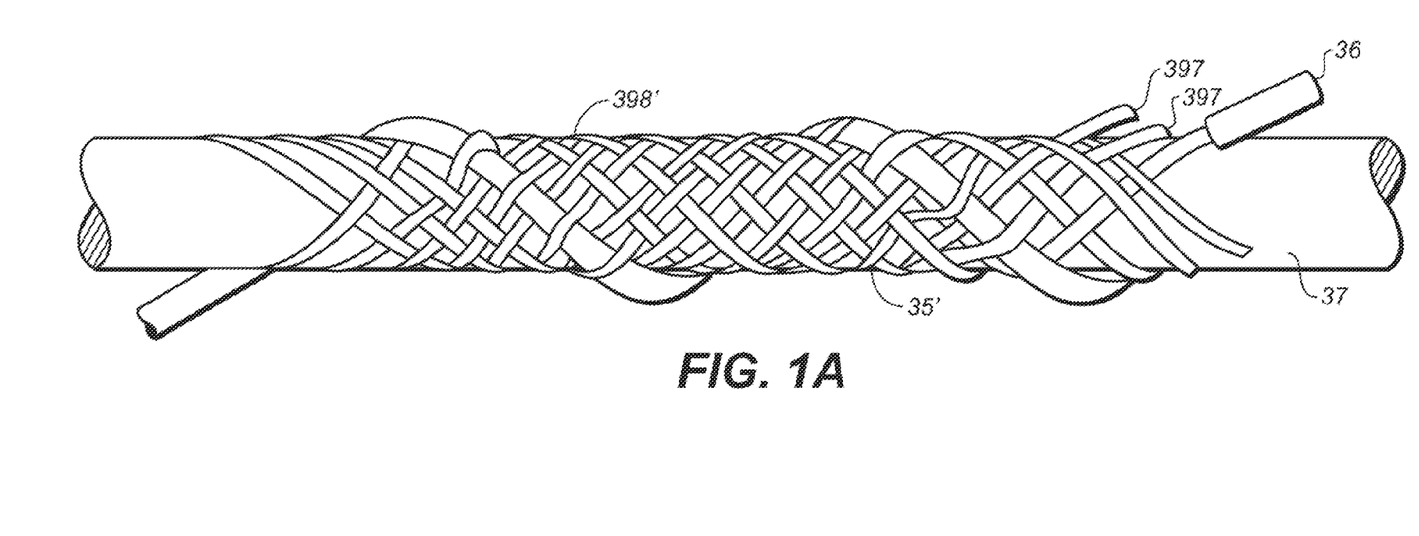
FIG. 1A is a plan view of an alternative embodiment of the helix rope of FIG. 1 also revealing various layers included in one embodiment thereof.

FIG. 1 illustrates a helix rope in accordance with the present disclosure that is identified by the general reference character 35. In reference to FIG. 1, the helix rope 35 of the present disclosure includes a braided sheath 398 formed about a strength member core 37. The braided sheath 398 is formed of multiple strands 397 and at least one helixing strand 36. The helixing strand 36 may be situated mainly about the outside of the braided sheath 398, such as when helixing strand 36 is formed of a substance such as polyurethane and adhered mainly to the outside of braided sheath 398. Or, as illustrated in FIG. 1A, the helixing strand 36 may be included within and among the weave of the strands forming braided sheath 398' so as to form alternative embodiment helix rope 35'. That is, the helixing strand 36 may be treated like a strand 397 other than that it is larger in diameter and preferably is more elastic, thereby forming alternative embodiment helix rope 35'.

The present disclosure is based upon the surprising and shocking discovery that a helix rope 35 or 35' of the present disclosure having greater than sixteen strands 397 forming its braided sheath 398 or 398', and preferably approximately twenty to twenty-four strands 397 forming its braided sheath 398 or 398', contrary to the state of the art and against the trend in the industry provides a highly favorable helix rope 35 or 35' for forming the pelagic netting portion of pelagic trawls by exhibiting significant drag reductions at angles of attack typically planned for in mesh bars forming pelagic netting portions of pelagic trawls when compared to known helix ropes and even when compared to other favored, state of the art non-coverbraided ropes. This permits lowered fuel consumption, greater trawl mouth opening and bettered efficiency of pelagic trawl fishing operations.

The helix rope 35 or 35' of the present disclosure (hereinafter aggregately referred to as the "helix rope" or as the "helix rope 35") preferably has at least eighteen strands forming its braided sheath 398 or 398' (hereinafter aggregately referred to as the "braided sheath" or as the "braided sheath 398"), and at least twenty such strands for even greater drag reduction, and yet more preferably at least twenty-two such strands for yet greater drag reduction, and yet more preferably twenty-four such strands for a better combination of both drag reduction and strength retention, with from twenty-four to forty-eight strands 397 forming its braided sheath 398 being presently preferred for optimal drag reductions at minimal cost, with from twenty-four to fifty-six such strands being considered useful depending upon application requirements.

In order to manufacture a helix rope 35 of the present disclosure, in forming the braided sheath 398 of such helix rope a braiding machine is used having greater than sixteen carriers. While such practice increases rope manufacturing costs and is contrary to the state of the art and against the trend in the industry, it also surprising results in the lowered drag helix rope 35 of the present disclosure that reduces fuel costs, the economic benefit from the reduced fuel costs far outweighing the increased manufacture costs thereby also resulting in greater customer demand for such helix rope for use in forming the pelagic netting portion of pelagic trawls, as is contrary to the trend in the industry.

Figure 2:
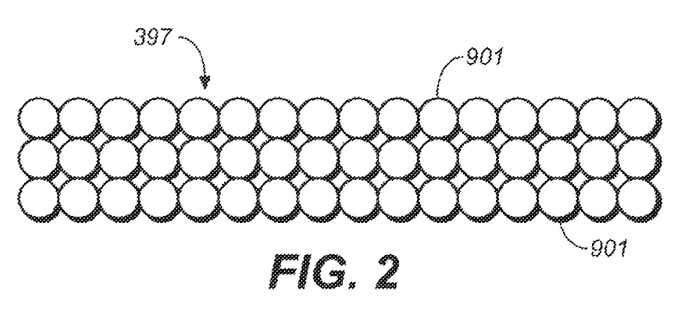
FIG. 2 is a cross sectional view depicting a construction of one of the strands forming the braided sheath of the helix rope of FIG. 1.

Ideally, the strands 397 are not circular in cross section, but are flattened, such as a tape (see FIG. 2), with a minimal thickness and a maximum width. The aspect ratio of the flattened strand 397 can be from 50:1 to 2:1, with from 2:1 to 12:1 being presently used, with at least 3:1, 4:1, 5:1, 6:1, 7:1 and 8:1 being preferred. This requires that each strand 397 is itself formed of at least two, and up to at least two hundred, individual linear elements (hereinafter "sub-strands") 901 that themselves are either fibers and/or filaments, or are plaits of fibers and/or filaments (see FIG. 3 and FIG. 4). Presently, each strand 397 is preferably formed of for example, three sub-strands for a smaller diameter helix rope, up to ten sub strands for a larger diameter helix rope, with at least two to three sub-strands for helix ropes of a diameter (herein including "equivalent diameter") of lesser than nine mm being presently preferred, and with at least three to five sub-strands for helix ropes of a diameter greater than nine mm being presently preferred. The term "equivalent diameter" shall mean the diameter a rope would be if it was a rope having a circular cross section, when measured with about 5 Kg of tension, say 4 to 5.5 Kg of tension. This can be calculated by measuring the volumetric displacement of a rope, and applying that to a cylindrical form, in order to arrive at the cylinder's diameter.

The thickness of the braided sheath 398's wall is preferentially less than one millimeter, and may be up to two millimeters.

In order to optimize the flattened form of each such strand 397, the multiple individual sub-strands 901 either are laid parallel to one another or are loosely laid (i.e. twisted) about one another so as to result, after being braided about the strength member core 37, in the flattened tape-like shape mentioned above. Presently, parallel laid is the preferred embodiment. The sub-strands themselves either can be parallel laid or twisted plaits and formed either of further sub-sub-strands or of individual filaments and, or fibers.

As shall be readily apparent to those skilled in the art upon having read the instant disclosure, the exact count of the sub-strands 901 to form strands 397 forming the braided sheath of any particular Helix rope of the present disclosures determined by several factors, primarily being:
 a) a diameter of strength member core 37 that forms the core about which the braided sheath is formed;
 b) a desired thickness of the braided sheath;
 c) a desired pick-angle and corresponding constructional elongation ability of the braided sheath;
 d) a desired strength and elasticity of the braided sheath in relation to the strength and elasticity of the strength member core 37 forming the core; and
 e) a selected filament and/or fiber type for forming the strands and/or sub-strands.

Experimentation with any carrier count and strand count, for any particular braiding machinery, taking into account at least the above factors shall allow those skilled in the art to determine whether the sub-strands 397 are better laid parallel to one another or loosely twisted, and to what degree to twist them if they are to be twisted, i.e. what pitch they are best twisted at.

Figure 3:
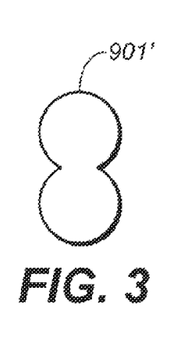
FIG. 3 is a cross-sectional view of sub-strands forming the strand of FIG. 2.
Figure 4:
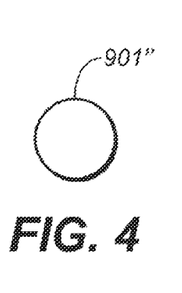
FIGS. 4 through 11 are cross sectional views of various embodiments of the helixing strand 36 shown in FIG. 1.

For example, for a roughly ten to twelve millimeter diameter helix rope of a minimal strand count according to the known art, each strand is formed of three parallel yarns, and each of the yarns has six monofilaments within it that are twisted rather loosely. The looseness of the twist is selected so that the monofilaments in the yarn can move relative to one another so as to permit the yarn to form a flattened shape to the yarn when the braided sheath is formed. The monofilaments may be of circular cross section 901" as illustrated in FIG. 4, or may be of a "side-by-side" cross sectional configuration 901' as illustrated in FIG. 3. One skilled in the art can begin with this formula, and upon having read the information contained within the instant disclosure, empirically derive a suitable strand construction for use in forming any diameter of any helix ropes of the present disclosure, it being the practice in the art to empirically derive any rope construction formulas to fit any particular fabrication plant's particular braiding machinery, twisting machinery, filament type, tension applied to carrier strands, diameters and other characteristic of the components, machinery and methods in forming a certain rope.

Most ideally, those sub-strands that pack better, i.e. result in minimal void space and preferentially no void space between the sub-strands, as well as between the strands themselves that form the braided sheath, are preferable for a given strength. Various conventional sub-strands having asymmetrical cross sections that also are sufficiently strong while packing better than circular cross sectional shaped sub-strands 901 are useful.

Ideally, the sub-strands forming the strands 397 that in turn form the braided sheath 398 have minimal and preferably no void space between one another. For maximal abrasion resistance and aesthetic acceptance by end users, ideally each of the strands 397 contact adjacent strands 397, so that portions of strength member core 37 or portions of whatever is enveloped by the braided sheath is not discernible by an unaided healthy human eye.

For a superior drag reducing embodiment, at least some diameters of helix rope of the present disclosure including approximately sixteen mm and eighteen mm diameters have been found to have a lowest drag when void space exists between adjacent strands forming the braided sheath, so that what is enveloped by the braided sheath is discernible by an unaided healthy human eye. In such embodiments it is still preferable that the helix rope of the present disclosure has minimal, including no void space between sub-strands forming the strands making up the braided sheath.

To assist this preferred construction of the sub-strands and strands, a type of monofilament shown in FIG. 4, indicated by reference numeral 901' and known as "glued together" or "side by side" monofilament, is highly useful and presently preferred. Such monofilaments are made by extruding two circular cross section monofilaments from dies that are situated very close to one another so that prior to the filaments fully drying the adjacent filaments adhere to one another, forming a monofilament of a roughly figure eight cross section.

However, when such "side by side" monofilament strands are not available, presently circular cross sectional shaped sub-strands 901" shown in FIG. 4 as well are highly useful, most commonly used and are one form of the preferred embodiment.

Polyethylene and various forms of high tenacity polyethylene are useful, and any hydro-phobic substances are preferred for lower drag applications than hydrophilic substances for forming the braided sheath and the strands and sub-strands. In certain applications and especially in high abrasion applications nylons and other hydrophilic substances are useful.

Alternative Embodiments

As taught herein and above, a helix rope of the present disclosure can be made with the helixing strand 36 included among and within the weave of the strands 397 forming the braided sheath 398. However, an alternative embodiment of the present disclosure also is taught herein where the helixing strand 36 is adhered to the outside surface of the braided sheath. In both embodiments, the helixing strand 36 forms cambered sections in the helix rope of the present disclosure when appropriate cross sectional shapes are selected for helixing strand 36.

When helixing strand 36 is not included within the weave of the braided sheath 398 of the helix rope 35 of the present disclosure, it is preferably to adhere helixing strand 36 to the outside surface of the helix rope 35 of the present disclosure in order to obtain the cambered sections. Preferably, this is accomplished by applying a bead line of a flow-able material, such as a liquid or semi-liquid material, that hardens into a helixing strand 36 that is sufficiently rigid and durable to tolerate the conditions of a commercial pelagic trawl net's use.

In continued reference to FIG. 1:

A presently preferred method for forming a helix rope of the present disclosure by adhering a helixing strand 36 to the outside surface of the braided sheath 398 is to situate besides a length of coverbraided rope a polyurethane blending machine having an injection head constructed, configured and constructed to provide the desired cross sectional shape for the helixing strand 36. The length of coverbraided rope can be formed from a conventional coverbraided rope or other rope used in forming pelagic trawl nets as factors influencing drag are markedly different when helixing strand 36 is not included within the weave of the strands forming the braided sheath. The injection head is positioned adjacent to the outside surface of the length of rope. The rope is being fed out from a pay out spool while simultaneously being taken up on a take up spool. Both the pay out spool and the take up spool are turning in synchronization governed by gears and/or electronics so as to cause the length of rope in between them to rotate about its longitudinal axis, preferably without imparting any twist or rotation into the rope itself.

Near the pay out spool there is a die to stabilize the length of the rope between the two spools. The injection head is located at the downstream end of this die. Downstream of the injection head the rope passes through an linearly shaped oven of about ten meters in length, with the take up spool located downstream of the oven.

As the polyurethane bead is deposited onto the rotating surface of the rope, the speed of rotation is selected so that the centrifugal pull of the rotation helps the bead maintain its relief over and above the rope's outside surface. Passing through the oven, sufficient heat is applied in sufficient lack of humidity so as accelerate adherence of the polyurethane blended material to the outside surface of the rope and also to cause the bead of blended polyurethane to dry in the oven and prior to being taken up on the take up spool.

Substances that accelerate the setting (herein including "drying") of the polyurethane material, as are conventionally known in the art, are selected for use with and in the polyurethane blending machine. That is, such substances are blended with the polyurethane just prior to the bead being applied to the outside surface of the rope of the present disclosure, resulting in another preferred embodiment of Helix rope of the present disclosure.

Additionally, substances that reduce drag and/or increase lift of the helix rope of the present disclosure, and that increase the elasticity of resultant helixing strand 36, increase its abrasion tolerance, and resistance to degradation by elements such as light, heat, cold and salt water can be added to the liquid or semi liquid bead prior to its being deposited onto the outside surface of the rope. Furthermore, substances that affect its affinity to water, such as silicon or Teflon, or in certain applications substances that enhance its affinity to water, can be sprayed onto the bead forming helixing strand 36 prior to, just prior to or after setting of the bead, depending upon the exact material used in the bead and the exact substance being added.

The elasticity of the material forming the bead forming helixing strand 36 is selected so that the helixing strand 36 is at least as elastic as the remainder of the Helix rope of the present disclosure itself. However, more preferably the elasticity of helixing strand 36 is sufficiently greater than the elasticity of the remainder of such Helix rope itself, as well as sufficiently greater than the elasticity of the strands 397 forming the braided sheath 398 so that at maximal elasticity of the Helix rope the helixing strand 36 is at less than 80% of its elasticity prior to break point.

Figure 5:
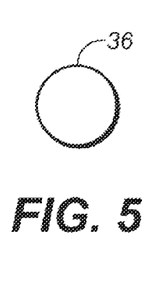
Figure 6:
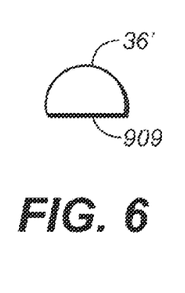
Figure 7:
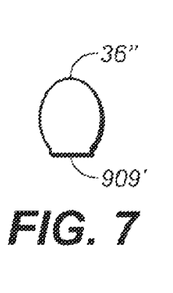
Figure 8:
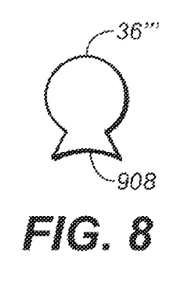
Figure 9:
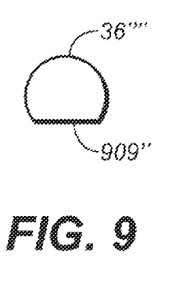

The internal shape of the injector head's nozzle largely determines the cross sectional shape of the polyurethane (or other) helixing strand 36 formed in using this injection head method described above. While circular cross sections for helixing strand 36 as shown in FIG. 5 are highly useful, it can be more difficult to strongly adhere them to the surface of the braided sheath. FIGS. 6 to 11 show cross sectional forms for helixing strands 36, indicated by reference numerals 36' to 36'''''', that provide for a greater adherence surface area 908 for contacting the external, surface of the braided sheath, that cross section of the helixing strands of FIGS. 6 to 11 being asymmetrical. The cross sectional shape of helixing strand 36''' of FIG. 8, having adherence surface 908, is presently preferred. For the purpose of the instant disclosure a cross sectional shaped helixing strand 36 having a portion of its cross sectional shape expanded so as to provide a greater surface area for adherence to the external, surface of the braided sheath, as taught in FIGS. 8 to 11, is known as a "footed shape". The presently preferred footed shape is that shown in FIG. 8, which is in its majority the greater part of a circular shaped cross section that is attached to a footed shape, and preferentially to a cambered footed shape. The radius of the arc of cambered surface 908 is preferentially one that matches the radius of the are of any braided sheath and/or exterior surface of a rope upon which footed surface 908 is intended to be adhered to. Even flat footed surfaces 909 to 909" of FIGS. 6, 7 and 9 are suitable as the flow-able polyurethane can adapt itself to fit the braided sheath's external surface's shape prior to setting, depending upon how rapidly the liquid and/or semi-liquid bead of polyethylene is dried, for which factors the drying temperature, humidity, concentration and type of accelerants, and the speed of rotation of the rope upon which the bead of polyurethane is being deposited are all taken into account and the optimal values and rates for such are experimentally determined for any particular rope diameter, braided sheath surface, intended volume of helixing strand 36, relative affinity to water and/or oil of the braided sheath, and polyurethane material, as shall be readily apparent to those skilled in the art upon having read the instant disclosure.

Figure 10:
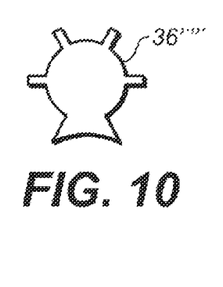
Figure 11:
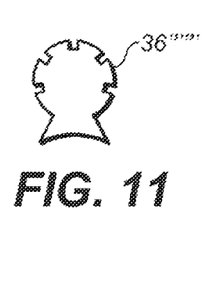
Figure 12A:
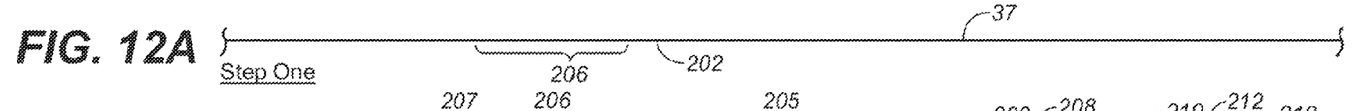
FIGS. 12A through 12G show steps of a method for forming a sling of the helix rope disclosed herein.
Figures 12B, 12C:
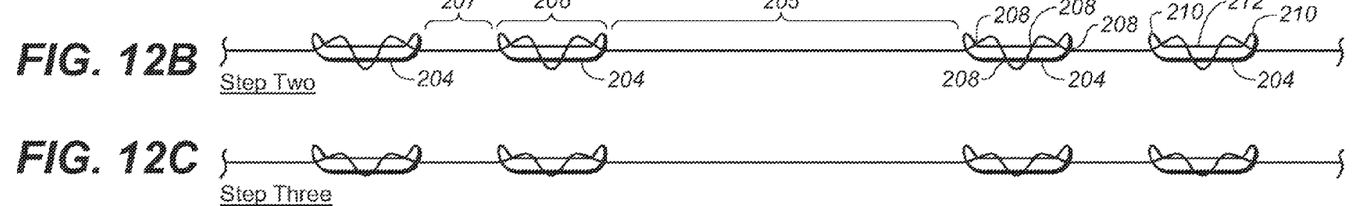
Figure 12D:
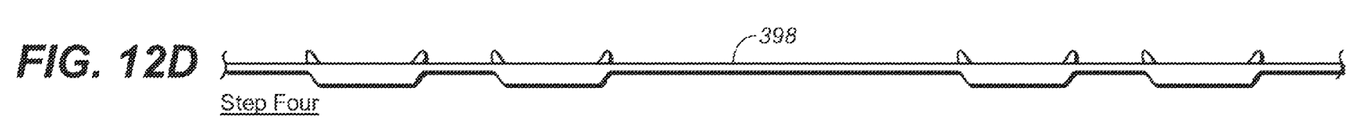
Figure 12E:
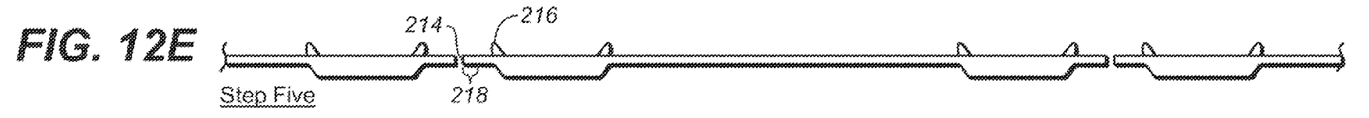
Figure 12F:
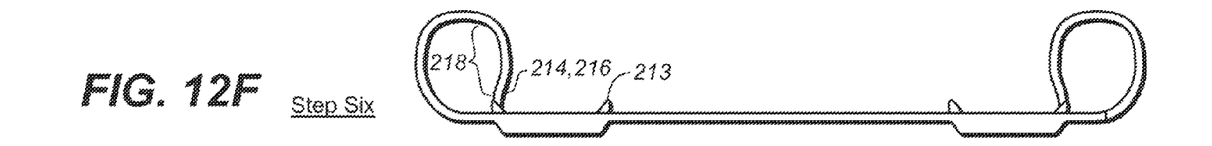
Figure 12G:
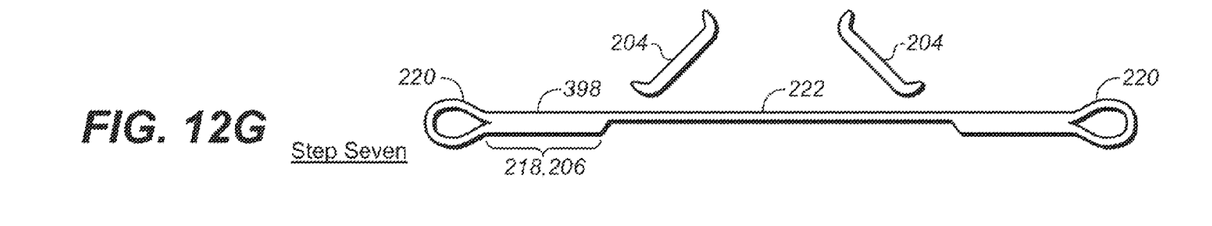

FIGS. 10 and 11 show alternative cross sectional shapes of helixing strand 36 intended to minimize drag and/or maximize lift, as indicated by reference numerals 36'''' and 36'''''.

In order to use the helix rope of the present disclosure to form a lowered drag self spreading trawl it is needed to:

(a) form as much of the pelagic mesh of the trawl as possible from the helix rope of the present disclosure; and (b) position the helix rope of the present disclosure in such a fashion that it has a particular orientation relative to the exterior of the trawl and also relative to the long dimension of the trawl. More particularly, the helix rope of the present disclosure is used to form mesh bars and/or mesh legs of the trawl where helix ropes 35 having either right handed or left handed lay orientations for the helixing strand are selected and positioned so that when viewed from external at least the top and sides of the trawl, and in the instances of a pure midwater trawl that shall not be fished in bottom contact when viewed from all sides of the trawl, with the mesh legs and/or mesh bars at intended angles of attack and intended percentages of mesh opening, the cambered sections of that portion of each helix rope that is external the trawl are able to generate lift vectors having greater magnitudes normalized to the long dimension of the trawl and directed away from the interior of the trawl compared to the lift vector magnitudes directed toward the long axis of the trawl and able to be generated by those cambered sections that are on the portions of the helix ropes internal the trawl. In other words, those cambered sections on the portion of the helix ropes that are internal the trawl are more parallel to the intended oncoming water flow and/or to the planned long dimension of the trawl than are the cambered sections of each helix rope that are internal the trawl. Another way of describing such orientation for helix ropes of the present disclosure to best be used to form a lowered drag self spreading trawl is that when viewed from a position both external the trawl as well as looking from the mouth of the trawl toward the aft of the trawl, those helix ropes 35 having right handed lays for their helix strand have their leading edges being the left side of each such helix rope, while those helix ropes 35 having left handed lays for their helix strand have their leading edges being the right side of such helix ropes.

Other uses for helix ropes of the present disclosure include forming lowered drag pelagic trawls where the lay orientation and/or orientation of the cambered sections of the helix ropes of the present disclosure is not controlled so as to result in a self spreading trawl. One fashion of forming such a lowered drag trawl of the present disclosure is to form all or as much as possible of the pelagic mesh of a trawl front helix ropes 35 where all such helix ropes have the same lay direction for their helixing strand.

Splicing Embodiments of the Present Disclosure

In order to minimize drag of pelagic trawls formed of helix ropes of the present disclosure, it is best to form slings of helix rope and connect those to form the pelagic mesh. Especially, such slings are used to form the legs and/or mesh bars of the pelagic mesh. A sling is a section of a rope having an eye at both ends, although in some instances an eye could be at only one end. To achieve the minimized drag it is needed to maximize the strength of the eye, and this is accomplished by forming an eye with a spliced connection where such spliced connection is made in such a fashion as to conserve more of the helix rope's breaking strength than is able to be conserved by the use of knots practical for use in pelagic trawls (i.e. knots not so bulky as to result in a high drag trawl, or in an easily abraded trawl). The following methods of the present disclosure are useful for forming spliced slings. The term "spliced sling" for purposes of the instant disclosure shall mean a portion of a helix rope of the present disclosure having a spliced eye located at one or both ends of itself.

Preferred Spliced Helix Rope Sling Production Method

Step One: a predetermined length of strength member core 37 is selected (the predetermined length of strength member core 37 hereinafter referred to as the "core rope"). The core rope preferably is a hollow braided rope. The core rope may have no impregnation material, or may have less than 50% by weight of the maximum amount of any type of impregnation material that it is capable of absorbing, or it may be fully impregnated. Minimal drag properties in pelagic trawl applications have surprisingly and contrary to the state of the art been found when the core rope has no impregnation material to an amount of impregnation material that is less than 70% by weight of the maximum amount of an impregnation material that the core rope is cable of absorbing, and especially less than 50% by weight of such impregnation material as mentioned supra. However, when the core rope is intended for other applications, as the present disclosure's splicing method may be used to form ropes for other applications, including seismic applications, paravane lines, seismic lines, yachting lines, rigging lines, anchoring lines, deep water oil rig mooring lines, towing warps and trawler towing warps and any other uses for rope, cable or chain, and also such as when the core rope is made from a UHMWPE, a maximal amount of a suitable impregnation material has been found to be advantageous.

Step Two: an eye is spliced at one end of the length of the core rope, and preferably an eye is spliced at both ends of the length of the core rope, forming a core rope sling. The preferred splice method is to insert the cut end of the core rope into the hollow body of the hollow braided core rope by opening up the braid of the core rope and passing the cut end and the part of the core rope intended to form the inserted portion of core rope forming part of the splice braid zone into the body of the core rope intended to form the external portion of the core rope forming part of the splice braid zone, and then either leaving the cut end of the core rope enclosed within the hollow body of the core rope in the intended splice braid zone or pulling the cut end of the core rope out of the body of the core rope at a point that is at an end of the splice braid zone that is farthest from the eye formed by this process.

Step Three: several core rope slings are attached to one another in order to form a linear element formed of a series of such core rope slings. The various core rope slings are attached to one another to form such linear element by connecting subsequent (and/or intended to be subsequent) core rope slings eye to eye with sections of twine, the twine forming such sections of twine hereinafter also known as "connecting twine". An intermediate length of connecting twine is left in between the interconnected eyes of each subsequent core rope sling so that such intermediate length of connecting twine is about from five centimeters to 200 centimeters in length, or even more, depending upon the ultimate length of the splice braid zone to be coverbraided. This intermediate length of connecting twine equals approximately double the length of any core rope sling's splice braid zone, or is even about double such length plus an additional five to twenty centimeters.

Step Four: the interconnected core rope slings are wound upon a reel and/or spool that shall be used with or in conjunction with a feed out spool and/or a feed out wheel of a conventional braiding machine designed and configured to form braided sheaths about lengths of rope and/or other linear elements. Care is taken to impart minimal and preferably no rotation to the core rope slings so as to avoid imparting torque to the final finished product. In all cases care is taken to ensure that the core rope slings remain torque free, i.e. lacking a tendency to rotate about their longitudinal axis when tension is applied to the core rope sling and/or to the finished product.

Step Five: a length of twine is passed over the take up wheel and affixed to the take up spool at one end, such length of twine hereinafter also known as the "take up twine". At another location on the length of take up twine that corresponds to a location intended for the braid point the various strands 397 and the helix strand 36, i.e. the strands forming the braided sheath, also are attached to the take up twine. Care is taken to ensure that sufficient length of the take up twine remains upstream of the braid point to permit future knotting and connecting as is described further below, and that such upstream portion of the take up twine is retained outside of the converging braid strands in order to preclude it becoming covered by or enclosed within a hollow braided sheath that is intended to be formed, such withdrawn portion of the take up twine also to be known hereinafter as the "withdrawn portion of take up twine".

Step Six: the operation of the braiding machine is started causing a hollow braided sheath formed of the strands 397 and the helixing strand 36 to be formed.

Step Seven: after a predetermined length of the hollow braided sheath is formed, such predetermined length corresponding to about twice the length of the splice braid zone of any eye of any core rope sling being used as a strength member core, plus an additional about ten to twenty centimeters to be used for future steps, the braiding machines operations are paused.

Step Eight: an eye of a first core rope sling that also is an eye forming the distal end of the linear element formed of several interconnected core rope slings and at least a corresponding splice braid zone of the same first core rope sling's eye are inserted into the interior zone of the converging strands forming the hollow braided sheath, and then the eye is withdrawn from within the interior zone of the converging strands forming the hollow braided sheath by passing it through the converging strands forming the hollow braided sheath proximal where such strands enter the braid point.

Step Nine: the withdrawn eye is extended and collapsed, i.e. not opened, and is laid alongside the section of hollow braided sheath formed as a result of the above steps so that the base of the eye, i.e. that portion of the open eye most proximal the splice braid zone, is near the braid point, and the furthest portion of the eye from the base of the eye is further downstream from the braid point.

Step Ten: The action of the braiding machine is started briefly so as to make preferably one wrap, and up to two, three or four wraps of the strands forming the braided sheath about the splice braid zone adjacent the withdrawn eye, then the action of the braiding machine is again paused.

Step Eleven: The withdrawn portion of take up twine is passed through the withdrawn eye of the first core rope sling and knotted back on itself so as to affix the withdrawn eye of the first core rope sling to the withdrawn portion of take up twine, thus attaching the withdrawn eye to the take up wheel thereby allowing to impart traction to the withdrawn eye and thus to the entire core rope sling and any other core rope slings connected to it.

Step Twelve: the hollow braided sheath is severed just upstream of the point where the withdrawn length of twine attaches to the hollow braided sheath.

Step Thirteen: While the braiding action of the braiding machine is retained as paused, the take up spool is energized so as to advance downstream the hollow braided sheath and the braid point, thus tightening the withdrawn portion of take up twine connecting the hollow braided sheath and the withdrawn eye.

Step Fourteen: the upstream severed length of hollow braided sheath is now bent back (i.e. "doubled hack") and passed through the withdrawn eye and then passed into the interior zone of the converging strands forming the hollow braided sheath and then laid alongside the splice braid zone corresponding to the withdrawn eye.

Step Fifteen: the take up wheel is now, if necessary, reversed from its take up direction to a pay out direction so as to cause the braid tension to become reduced and also so as to cause the braid angle to become more obtuse, until the braid angle is nearer to eighty-nine degrees than it is to seventy degrees when measured between the braid ring and a converging strand used in forming the hollow braided sheath, with a braid angle of about eighty to eighty-seven degrees being also useful, with the result that the core rope sling's material is not visible to an unaided eye after the braided sheath 398 has been formed about the splice braid zone of the core rope sling.

Step Sixteen: the action of the braiding machine is then commenced again, including that the take up spool again commences to rotate in a "take up" direction, causing the braided sheath 398 to form about the splice braid zone corresponding to the withdrawn eye.

Step Seventeen: when the braid point is proximal the point of the splice braid zone that is furthest from the withdrawn eye, the action of the braiding machine is again paused.

Step Eighteen: the take up spool is advanced while the action of the braiding machine remains paused, so as to increase the braid tension and also so as to create a less obtuse (i.e. more acute) braid angle, with the result that the core rope sling's material is not visible after the braided sheath 398 has been formed about a portion of the core rope sling not having a splice braid zone.

Step Nineteen: the action of the braiding machine is again started and continued to operate so as to cause the braided sheath 398 to form about the length of core rope sling up to the point that a portion of the next splice braid zone arrives at the braid point.

Step Twenty: the action of the braiding machine is again paused, and the take up spool is again reversed, again reducing the braid tension and again causing the braid angle to become more obtuse, again so as to achieve the result that no portion of the material forming the core rope sling is visible to the unaided eye after the braided sheath 398 has been formed about the splice braid zone of the core rope sling.

Step Twenty-One: a "removable void spacer" is provided. The void spacer may have its terminal ends bent at ninety degrees or otherwise not parallel to the axis of the main length of the void spacer, with such terminal ends' long dimensions preferably both aimed in a similar orientation. A preferable removable void spacer is formed of a hollow steel tube such as a hollow steel pipe having a steel eye welded at one end of the pipe and having a high quality steel cable of suitable diameter doubled over and inserted into the other end of the steel pipe and held in place by solidifying a molten head weld inside the end of the pipe. The result of such a construction method for a removable void spacer is a removable void spacer designed and configured so as to result in a hollow steel pipe having a loop of high grade steel wire protruding at one end and having a steel eye affixed to its other end, such as may be a link of steel chain welded to such other end of the hollow steel pipe. Such preferable removable void spacer shall be known as "the preferred removable void spacer".).

Step Twenty-Two: a preferred void spacer is situated alongside the splice braid zone that is most proximal the braid point in such a fashion that the steel eye of the preferred void spacer as well as some length of the steel pipe of the preferred void spacer is lying alongside the braided sheath 398 while the majority of the preferred void spacer's steel pipe is lying alongside the core rope sling's still uncovered splice braid zone in such a fashion that the steel pipe ends and the steel wire loop commences where the exposed splice braid zone meets its open spliced eye. To effectively so position the preferred void spacer, it is needed to first insert the preferred void spacer into the interior zone of the converging braid strands, and then to withdraw that portion of it that is to lie alongside the braided sheath 398 by passing the steel eye of the preferred void spacer through the converging strands forming the braided sheath proximal where such strands enter the braid point.

Step Twenty-Three: the take up wheel is now again reversed from its take up direction to rather a pay out direction so as to cause the braid tension to become reduced and also so as to cause the braid angle to become more obtuse, until the braid angle is nearer to eighty-nine degrees than it is to seventy degrees when measured between the braid ring and a converging strand used in forming the hollow braided sheath, with a braid angle of about eighty to eighty-seven degrees being also useful, with the result that the core rope sling's material is not visible to an unaided eye after the braided sheath 398 has been formed about the splice braid zone of the core rope sling.

Step Twenty-Four: the action of the braiding machine is then commenced again, causing the braided sheath 398 to form about the splice braid zone.

Step Twenty-Five: the action of the braiding machine is again commenced including that the take up spool again commences to rotate in a "take up" direction until the braided sheath 398 is formed to about the location where the splice braid zone meets its open eye.

Step Twenty-Six: The braiding machine's operations are again paused.

Step Twenty-Seven: a connecting line connecting the two open eyes most proximal the braiding point is severed, and that open eye having its splice braid already covered by the braided sheath 398 is withdrawn from within the interior zone of the converging braid strands in a similar manner as described supra for withdrawing an open eye from within such interior zone of converging braid strands, and the other eye is retained on a hook that is provided underneath the braid point.

Step Twenty-Eight: The braiding machines action is again started so as to cause more hollow braided sheath to be formed downstream of the withdrawn eye, the length of hollow braided sheath to be formed again corresponding to about two times the length of the splice braid zones present on the core rope slings plus an additional about twenty centimeters of length.

Step Twenty-Nine: when about half the intended overall length of the hollow braided sheath being formed in the above step is completely formed, the braiding machine is again paused and a section of twine is attached at the braid point to the strands forming the hollow braided sheath, said section of twine being about twice the length of a splice braid zone to be coverbraided, and said section of twine being retained outside of the converging braid strands. This section of twine is hereinafter also known as the "next eye connecting twine".

Step Thirty: the braiding machine is again started and operated until the intended length of the hollow braided sheath is formed.

Step Thirty-One: The eye of the core rope sling that has been retained on a hook underneath the braid point is now inserted into the interior zone of the converging braid strands, and then withdrawing from such interior zone of converging braid strands in the fashion as described above for withdrawing eyes from such interior zone of converging braid strands, while the splice braid zone corresponding to this eye is retained within the interior zone of the converging braid strands so that it can be coverbraided. This eye is then attached to the next eye connecting twine.

Step Thirty-Two; The length of hollow braided sheath is severed about in half.

Step Thirty-Three: While the braiding action of the braiding machine is retained as paused, the take up spool is energized so as to advance downstream the hollow braided sheath and the braid point, thus tightening the eye connecting twine that connects the hollow braided sheath and the withdrawn eye.

Step Thirty-Four: the downstream severed end of the braided sheath is inserted into the open portion of the steel wire loop forming the terminal end of the void spacer nearest the end of that eye already having had its splice braid zone coverbraided and also having the preferred void spacer situated proximal its splice braid zone. The severed end may be frayed prior to being so inserted. Then the severed end is bend back, that is doubled over the steel wire loop, and held in place by hand by being squeezed together with the other portion of the hollow braided sheath near the steel wire loop. The severed ends may be wrapped tightly with tape and then cut into a spiked, tapered shape to facilitate such insertion and retention.

Step Thirty-Five: the preferred void spacer is pulled out from between the sheath and the core rope, in a direction that draws the severed end of the braided sheath into within the braided sheath and causes it to occupy a position between the braided sheath and the core rope's splice braid zone that previously was occupied by the preferred void spacer. A hydraulic or pneumatic ram is useful for so withdrawing the preferred void spacer. Optionally, a lubricant may be added to assist in drawing the severed hollow braided sheath into position. Such lubricant also may be used to lubricate the preferred void spacer prior to its use. Such lubricant is especially useful should the braided sheath be formed of highly inelastic materials such as UHMWPE and others. This step may be made either when the portion of splice braid zone with the preferred void spacer is upstream of or downstream of the take up wheel, so long as tension is maintained on the coverbraided core rope sling so as to permit withdrawing the preferred void spacer. The take up wheel may be cushioned or padded to permit the preferred void spacer to pass over it under tension without damaging either the product being formed of the machinery.

To produce further and subsequent spliced eye rope slings of the present disclosure, the actions, steps, methods and processes described in Steps Fourteen and onward are now repeated in the order and sequence as described hereinabove in order to produce the next spliced eye rope sling of the present disclosure. Then, the Steps Fourteen and onward may again be repeated, each time they are repeated another rope sling of the present disclosure being formed, until the linear element formed from the interconnected core rope slings is consumed. Then, Steps One and onward are repeated in order to form more rope slings of the present disclosure as desired.

Preferably, prior to splicing the eyes into any section of core rope so as to form a core rope sling, a very abrasion resistant, very durable sheath is slid upon the core rope and maintained in a region corresponding to any intended open eye to be formed, thereby resulting in a sheathed eye. The best construction for such a sheath is a hollow braided construction that has been made rigid by use adhesives and by forming a hollow braid of very tight wraps about a rod or rope that is then removed from such hollow braid where such rope or rope has a diameter that is sufficiently larger than the diameter of the core rope to be sheathed so that it is not difficult to pass the body of the core rope into the sheath. The rigidity imparted to any eye by such sheath greatly facilitates handling of the eyes in the production process of the present disclosure.

It is important that the braid angle and the elasticity of fibers forming both the braided sheath and forming the strength member of either the rope or of the spliced eye rope sling of the present disclosure, or of any other rope or of any other sling of the present disclosure, are selected so that the braided sheath and the strength member core or their equivalents both experience total failure at the same elongation of the final produced rope or its counterparts. For example, when less elastic fibers form the braided sheath, and more elastic fibers form the strength member core rope, the strength member core rope's strands are of a less obtuse braid angle than are the strands forming the braided sheath.

Less Preferred Spliced Helix Rope Sling Production Method

Refer now to FIGS. 12A through 12G which illustrate a less preferred method for forming a sling of the rope disclosed herein.

Step One: The method begins with a length 202 of core rope 37. This may be done by laying on a table the length 202 of core rope 37 that is attached at one end to a feed out spool and attached at another end to a pay out spool neither of which are illustrated in FIGS. 12A through 12G, on which such spools additional lengths of the core rope 37 preferably are situated.

Step Two: A "void spacer 204", described in greater detail below, passes through the length 202 of the core rope 37 at a region (zone) in the length 202 that corresponds to any intended splice braid zone 206 for any intended sling being formed by the method of the present invention. The void spacer 204 is passed through the length 202 a number of times that corresponds to any intended number of "tucks 208" (including "passes" and "pass throughs") it is intended for the splice to have. At least two tucks 208 is preferred, with four tucks 208 being shown in FIGS. 12B and 12C.

Positioning void spacers 204 in order to form a sling: between any void spacer 204 and any adjacent void spacer 204 is either:

(i) a length 202 of core rope 37 intended to form the core of a portion of the rope forming the between-eye portion of the sling, as indicated by "core rope 37 between-eye portion 205"; and (ii) a length 202 of core rope 37 intended to form the core of a portion of rope that is intended to form the "tucks 208" or "passes" of the splice, as indicated by "core rope tuck zone 207."

The void spacers 204 each can be a hollow tube such as a rigid steel pipe, or can be a flexible rubber hose of adequate diameter, or can be a Teflon coated solid rubber object. It is anticipated that flexible void spacers 204 that do not resist deforming to an extent that allows the core rope 37 with included void spacers 204 to be spooled and unspooled to facilitate further processing steps is preferred.

To further discuss preferred constructions and configurations of the void spacers 204: a void spacer 204 may have its terminal ends 210 bent at ninety degrees or otherwise not parallel to the axis or long dimension of the main length 212 of the void spacer 204, with such terminal ends' long dimensions preferably both aimed in a similar yet "mirror image" orientation. Preferably, the void spacer's terminal ends are dull and tapered and/or rounded, even spike shaped with a dulled tip. The end of the void spacer 204 that the cut end of the rope is intended to be inserted within or otherwise attached to may be a tapered wedge shape adapted to receive a sharp, wedge cut portion of rope that is affixed to the void spacer's respective end such as by taping. Or, the terminal ends of the void spacer 204 may be hollow with a cavity of sufficient depth to receive a cut end of the rope and frictionally retain it for the subsequent step of drawing the cut end through that portion of the rope occupied by the void spacer 204, and can be similar to the pointed tip of a dull hypodermic syringe. The terminal end of the void spacer 204 not proximal the portion of the core rope 37 that is intended to correspond to the cut part of the rope to be formed by the coverbraiding process is itself not necessarily hollow, but is constructed and configured in such as way as to remain outside the braided sheath and permit easy removal from the braided sheath, for example has an aperture located in the region of a point 213 (see Step Six) that can be grabbed with a hook or gaff.

Step Three: The core rope 37 is made snug around the void spacer 204. (This step is optional, but preferred.)

Step Four: The length 202 of core rope 37 with attached void spacers 204 is passed through a braiding machine so that a braided sheath 398 is progressively braided about the combination of the core rope 37 and included void spacers 204 from one end to another end of the length 202 of core rope 37. By including a product strand 36, thus is formed a length of rope encapsulating portions of the void spacers 204 attached to and passing through the core rope 37. In further detail: as the braiding machinery carriers are situating multiple strands 397 around the void spacer's terminal ends, it is insured, either by hand or by a vibrating mechanical brush or the like, that such terminal ends are not covered by the final braided sheath but rather that they protrude outside it.

Step Five: The length of rope is severed near the terminal end of each void spacer 204 that is most proximal the intended location of any eye intended to be formed, thus forming rope severed ends 214 near proximal ends 216 of the void spacer 204.

Usually, this includes cutting the rope between void spacers 204 in the middle of the shortest length of rope between void spacers 204, that itself usually is portion of the rope have core rope tuck zone 207.

Step Six: The severed ends 214 of rope are attached to respective proximal ends 216 of each void spacer 204. This may be accomplished by inserting the severed ends 214 of rope into a hollow end of the void spacer 204 nearest the intended location of an eye, and frictionally retained therein by pressure of the material of the sheath being compacted into the hollow interior of the void spacer 204. A shim may be inserted if additional friction is desired to permit the operation of step seven. The severed ends 214 may be wrapped tightly with tape and then cut into a spiked, wedged and tapered shape to facilitate such insertion and retention. Or, such shaped end of rope may be mated to a wedge shaped tapered terminal end of the void spacer 204, and held thereon by tape. Or, the severed ends 214 of the rope may otherwise be attached to such terminal end of the void spacer 204, such as by taping.

Step Seven: Each void spacer 204 with attached rope severed ends 214 is withdrawn from the rope in a direction that draws the severed ends 214 of the rope through that portion of the core rope 37 and braided sheath that was previously occupied by the void spacer 204, i.e. into the intended and preferably through the intended splice braid zone 206 of the core rope 37.

As a result, a portion of rope intended to form the splice braid, named "intended splice braid rope portion" and indicated by reference numeral 218, is drawn into and situated within a portion of the core rope 37 corresponding to splice braid zone 206 and also a portion of the braided sheath enveloping splice braid zone 206, especially into a position that previously was occupied by the void spacer 204.

Preferably, the terminal end of the void spacer 204 farthest from the severed ends 214 of the rope has an aperture that can be temporarily attached to by a hook or gaff, facilitating withdrawing the void spacer 204 from the rope with sufficient force to also draw the severed ends 214 of rope into the portion of the body of the rope that was occupied by the void spacer 204.

The void spacer 204 should have a diameter that permits easy sliding of the severed ends 214 of the rope into the body of the rope, while also not creating so much slack in the sheath of the rope that the sheath fails to tightly grab the inserted portion of rope and the core under pressure in such a fashion as to provide maximal strength to the splice.

As a result, a spliced eye 220 is formed into a tightly coverbraided rope, said spliced eye having strength greater than a mesh knot.

As a result also, a rope sling 222 is formed.

To make several rope slings 222 at once: preferably, several void spacers 204 are placed into a continuous length of core rope 37, each void spacer 204 being placed at a position that corresponds to an intended location of an intended splice braid zone 206 in the final rope. Then, the continuous length of core rope 37 is coverbraided. Then, the pertinent subsequent steps of the method of the present invention are carried out, resulting in any desired quantity of rope slings 222.

INDUSTRIAL APPLICABILITY

A helix rope sling of present disclosure as formed by the process taught hereinabove is useful for forming self spreading lowered drag trawls of lowered noise and also for forming lowered drag trawls of lowered noise. However, when the helixing strand 36 is omitted from the production process and replaced with another strand 397 so as to form a braided sheath of uniform strands, the remainder of the process taught hereinabove for producing spliced eye helix rope slings is then useful for producing spliced eye slings of coverbraided rope for any other application. When such coverbraided rope is to be used as yachting rope, seismic rope, superwides, towing warps, trawling warps, anchor lines, deep water oil derrick mooring lines, rigging lines and any other uses for rope, cable or chain, often it is advantageous to have a thermoplastic core within the rope. In such instances of having the thermoplastic core within the rope, that portion of the thermoplastic core corresponding to those portions of the core rope to be used in forming the splice braid zone and optionally as well any open eye preferably is removed prior to the splice being formed. Then, the core rope sling having the thermoplastic core is coverbraided so as to form a tightly coverbraided spliced eye sling having a thermoplastic core. It is to be noted that the thermoplastic core is itself contained within a sheath the stops molten and especially semi liquid phases of the thermoplastic core from exiting the rope during extreme pressure. A preferred production process of the present disclosure for producing ultra high strength light weight spliced coverbraided ropes is as follows:

Alternative Production Processes and Product

First: a thermoplastic core is provided, with or without lead inside the core for weight, and with or without inside the core insulated conductors designed and configured to tolerate being permanently stretched as needed to survive the production process now being disclosed. Polyethylene is a good material for most thermoplastic cores for this process.

Second: the thermoplastic core is enclosed within a sheath that is able to stop molten phases of the thermoplastic core from exiting the sheath or that is able to mainly stop molten phases of the thermoplastic core from exiting the sheath. Such a sheath can be formed of very densely and tightly braided polyester fibers or other fibers having a higher softening point than the softening point of the thermoplastic core.

Third: a strength member is formed about the combination of the thermoplastic core and the sheath enclosing the thermoplastic core. Preferred materials for forming the strength member are fibers formed of materials that are able to be creeped. For example, fibers of UHMWPE, such as Dyneema®. Creeped as used in this disclosure means that the fibers are able to be permanently elongated a certain percentage of their initial length under a certain tension and at a certain temperature, especially a temperature just lower than a phase change temperature of the material forming the fibers, without compromising the fibers integrity and long term usefulness, and preferably also without compromising the fibers strength. A preferred construction for forming the strength member is a braided construction and especially a hollow braided construction.

Fourth: an eye is spliced into one or both ends of the strength member, with a portion of the thermoplastic core corresponding to any intended splice braid zone being removed from the intended splice braid zone prior to completion of the splicing process and the sheath enclosing the thermoplastic core being tied off and knotted so as to become sealed, rather than left cut open, thereby stopping flow of future molten phases of the thermoplastic core from exiting the sheath. The result is an alternative core rope sling.

Fifth: the alternative core rope sling is transformed into an alternative coverbraided spliced eye sling using the process of the present disclosure for forming spliced eye helix rope slings, except that the use of a helixing strand 36 preferably is omitted and in its place a strand 397 is used so that all strands in the braided sheath are similar, and also except that the alternative core rope sling is used in place of a core rope sling. A preferred material for forming strands 397 forming the coverbraid is a material such as Dyneema or other UHMWPE. A settable adhesive substance, or a substance capable of being phase changed into an adhesive substance, where such adhesive substances have an elasticity of at least 10% at between zero degrees centigrade and negative fifteen degrees centigrade, and more preferably an elasticity of at least 50% at such temperatures, and more preferably an elasticity up to and even exceeding 500% at such temperatures and at temperatures that exceed sixty degrees centigrade preferably is situated about the outside of the strength member core, i.e. about the outside of the alternative core rope sling, just prior to the convergence of strands 397 forming the coverbraided sheath about the outside of the alternative core rope sling. That is, just prior to the formation of any sheath about the alternative core rope sling.

Sixth: excess of such adhesive substances are removed from the outside of the braided sheath.

Seven: the alternative coverbraided spliced eye sling formed in the above step and of the combination of the alternative strength member and the sheath enclosed thermoplastic core are next subject to a tension that preferably is lesser than 50% of the break strength of the alternative strength member, and more preferably is less than 30% of such break strength, and yet more preferably is less than 20% of such break strength, and yet more preferably is less than 15% of such break strength, and yet again more preferably is less than 10% of such break strength, and even yet again is more preferably less than 7% of such break strength, even more preferably is less than 5% of such break strength, with about 3% of such break strength being preferred and with lesser than 3% being useful.

Eighth: The combination of the tensioned alternative strength member and the sheath enclosed thermoplastic core are next subjected to a heat that is regulated and applied in such a fashion so as to cause all or at least the majority of the fibers forming the strength member core to approach near to, but to remain at lower than, their phase change temperature, while simultaneously causing the thermoplastic core to change to a molten phase. It is worth noting that the disclosed steps of first applying the disclosed tension to the alternative strength member, whether or not it is already used in forming either or both the alternative core rope sling or the alternative coverbraided spliced eye sling, and then subsequently applying the disclosed heat to at least the alternative strength member, again whether or not it is already used in forming either or both the alternative core rope sling or the alternative coverbraided spliced eye sling, is contrary to the state of the art.

Ninth: the tension and temperature are maintained until a desired amount of elongation of the strength member core can be detected, and preferably until it is detected.

Tenth: While the tension is maintained on the strength member, whether or not it is already used in forming either or both the alternative core rope sling or the alternative coverbraided spliced eye sling, and thus by extension also on the sheath enclosed thermoplastic core as well as on anything enclosed within the alternative strength member, the combination of any or all of the alternative coverbraided spliced eye sling; the alternative strength member and the sheath enclosed thermoplastic core and anything else contained within the strength member is cooled until the thermoplastic core has reach a solid phase, resulting in a high strength light weight synthetic rope sling useful for all the above mentioned uses.

Preferably, prior to splicing the eyes into the alternative core rope in order to form the alternative core rope sling, a very abrasion resistant, very durable sheath is slid upon the alternative core rope and maintained in a region corresponding to any intended open eye to be formed, thereby resulting in a sheathed eye. The best construction for such a sheath is a hollow braided construction that has been made rigid by use adhesives and by forming a hollow braid of very tight wraps about a rod or rope that is then removed from such hollow braid where such rope or rope has a diameter that is sufficiently larger than the diameter of the alternative core rope to be sheathed so that it is not difficult to pass the body of the alternative core rope into the sheath. The rigidity imparted to any eye by such sheath greatly facilitates handling of the eyes in the production process of the present disclosure.

Further Alternative Production Processes and Product

While the immediately above Alternative Production Process is useful for forming many ropes and high strength light weight spliced eye synthetic slings, in some cases it may be desired to form a high strength light weight synthetic rope without eyes, or it may be desired to form any of such products without a coverbraid. The following modification of the above taught production process is yet another alternative production process of the present disclosure for producing further alternative products of the present disclosure:

Firstly: a thermoplastic core is provided, with or without lead inside the core for weight, and with or without inside the core insulated conductors designed and configured to tolerate being permanently stretched as needed to survive the production process now being disclosed. Polyethylene is a good material for most thermoplastic cores for this process.

Secondly; the thermoplastic core is enclosed within a sheath that is able to stop molten phases of the thermoplastic core from exiting the sheath or that is able to mainly stop molten phases of the thermoplastic core from exiting the sheath. Such a sheath can be formed of very densely and tightly braided polyester fibers or other fibers having a higher softening point than the softening point of the thermoplastic core.

Thirdly: a strength member is formed about the combination of the thermoplastic core and the sheath enclosing the thermoplastic core. Preferred materials for forming the strength member are fibers formed of materials that are able to be creeped. For example, fibers of UHMWPE, such as Dyneema®. Creeped as used in this disclosure means that the fibers are able to be permanently elongated a certain percentage of their initial length under a certain tension and at a certain temperature, especially a temperature just lower than a phase change temperature of the material forming the fibers, without compromising the fibers integrity and long term usefulness, and preferably also without compromising the fibers strength. A preferred construction for forming the strength member is a braided construction and especially a hollow braided construction. The combination of the formed strength member formed about the combination of the thermoplastic core and the sheath enclosing the thermoplastic core is hereinafter also referred to as the "alternative core rope".

Fourthly: Optionally, an eye is spliced into one or both ends of the alternative core rope, with a portion of the thermoplastic core corresponding to any intended splice braid zone being removed from the intended splice braid zone prior to completion of the splicing process and the sheath enclosing the thermoplastic core being tied off and knotted so as to become sealed, rather than left cut open, thereby stopping flow of future molten phases of the thermoplastic core from exiting the sheath. The result is an alternative core rope sling. Whether or not an eye is spliced in order to form the alternative core rope sling, or should the alternative core rope be left without spliced eyes, the sheath enclosing the thermoplastic core is tied off and knotted so as to become scaled, rather than left cut open, thereby stopping flow of future molten phases of the thermoplastic core from exiting the sheath.

Fifthly: the alternative core rope formed in the above steps and that is of the combination of the strength member and the sheath enclosed thermoplastic core are next subject to a tension that preferably is lesser than 50% of the break strength of its strength member, and more preferably is less than 30% of such break strength, and yet more preferably is less than 20% of such break strength, and yet more preferably is less than 15% of such break strength, and yet again more preferably is less than 10% of such break strength, and even yet again is more preferably less than 7% of such break strength, even more preferably is less than 5% of such break strength, with about 3% of such break strength being preferred and with lesser than 3% being useful.

Sixthly: The tensioned alternative core rope that is the combination of the tensioned strength member and the sheath enclosed thermoplastic core are next subjected to a heat that is regulated and applied in such a fashion so as to cause all or at least the majority of the fibers forming the alternative core rope's strength member to approach near to but to remain at lower than, their phase change temperature, while simultaneously causing the thermoplastic core to change to a molten phase. It is worth noting that the disclosed steps of first applying the disclosed tension to the alternative core rope and or to the alternative core rope's strength member, whether or not it has a thermoplastic core, is contrary to the state of the art.

Seventhly: the tension and temperature are maintained until a desired amount of elongation of the alternative core rope's strength member core can be detected, and preferably until it is detected.

Eighthly: While the tension is maintained on the alternative core rope, whether or not it is already used in forming the alternative core rope sling, and thus by extension also on the sheath enclosed thermoplastic core as well as on anything enclosed within the strength member of the alternative core rope, the combination of any or all of the alternative core rope's strength member, the alternative core rope, the alternative core rope sling and the sheath enclosed thermoplastic core and anything else contained within the alternative core rope's strength member is cooled. If a thermoplastic core is used, the cooling is continued until the thermoplastic core has reach a solid phase, resulting in a high strength light weight synthetic rope and/or a high strength light weight synthetic rope sling useful for all the above mentioned uses.

Preferably, prior to splicing any eyes into the alternative strength member core, the same very abrasion resistant, very durable sheath is constructed, configured and used as mentioned above to both stiffen and protect the resultant eyes.

Although the present disclosure has been described in terms of the presently preferred embodiment, it is to be understood that such disclosure is purely illustrative and is not to be interpreted as limiting. Consequently, without departing from the spirit and scope of the disclosure, various alterations, modifications and/or alternative applications of the disclosure shall, no doubt, be suggested to those skilled in the art upon having read the preceding disclosure. Accordingly, it is intended that the following claims be interpreted as encompassing all alterations, modifications or alternative applications as fall within the true spirit and scope of the disclosure.

The invention claimed is:

1. A section of rope having at least one eye, the section of rope having the at least one eye being produced by a process, the process having steps of providing a strength member core of a rope, the process comprising steps of:
  a) situating an object adjacent to at least a portion of the strength member core of the rope;
  b) subsequently covering at least portions of the combination of the at least a portion of the strength member core of the rope and the object with at least a portion of a braided sheath formed of strands;
  c) attaching to the object a portion of a structure formed of the same strands that form the at least a portion of the braided sheath; and
  d) subsequently removing the object from the at least a portion of the braided sheath so as to cause the portion of the structure attached to the object to be drawn into at least a portion of the space within the at least a portion of the braided sheath enclosing the at least a portion of the strength member core of the rope that was originally occupied by at least a portion of the object, whereby a mainly coverbraided section of rope having at least one eye is economically produced.

2. The section of rope having at least one eye of claim 1 wherein prior to step (a) above the process further comprises an additional step of forming an eye in the at least a portion of the strength member core of the rope.

3. The section of rope having at least one eye of claim 2 wherein the process further comprises an additional step of forming into another part of the strength member core of the rope another eye.

4. The section of rope having at least one eye of claim 3, wherein the process further comprises an additional step of passing a severed end of the braided sheath formed of the same strands that form the at least a portion of the braided sheath through the another eye, subsequently situating the at least a portion of the severed end of the braided sheath alongside a portion of the strength member core of the rope adjacent to the another eye and subsequently enclosing both the at least a portion of the severed end of the braided sheath and the at least a portion of the strength member core of the rope adjacent to the another eye within another portion of braided sheath that is formed of the same strands forming the at least a portion of the severed end of the braided sheath.

5. A trawl that includes a section of rope having at least one eye, the section of rope having the at least one eye being produced by a process, the process having steps of providing a strength member core of a rope, the process comprising steps of:
  a) situating an object adjacent to at least a portion of the strength member core of the rope;
  b) subsequently covering at least portions of the combination of the at least a portion of the strength member core of the rope and the object with at least a portion of a braided sheath formed of strands;
  c) attaching to the object a portion of a structure formed of the same strands that form the at least a portion of the braided sheath; and
  d) subsequently removing the object from the at least a portion of the braided sheath so as to cause the portion of the structure attached to the object to be drawn into at least a portion of the space within the at least a portion of the braided sheath enclosing the at least a portion of the strength member core of the rope that was originally occupied by at least a portion of the object, whereby a mainly coverbraided section of rope having at least one eye is economically produced.

6. A trawl including a section of rope having at least one eye, the trawl including the section of rope having the at least one eye being produced by a process, the process including steps of providing a strength member core of a rope, the process comprising steps of:
  a) situating an object adjacent to at least a portion of the strength member core of the rope;
  b) subsequently covering at least portions of the combination of the at least a portion of the strength member core of the rope and the object with at least a portion of a braided sheath formed of strands;
  c) attaching to the object a portion of a structure formed of the same strands that form the at least a portion of the braided sheath; and
  d) subsequently removing the object from the at least a portion of the braided sheath so as to cause the portion of the structure attached to the object to be drawn into at least a portion of the space within the at least a portion of the braided sheath enclosing the at least a portion of the strength member core of the rope that was originally occupied by at least a portion of the object, whereby a trawl including a mainly coverbraided section of rope having at least one eye is economically produced.

7. The trawl including a section of rope having at least one eye of claim 6 wherein prior to step (a) above the process further comprises an additional step of forming an eye in the at least a portion of the strength member core of the rope.

8. The trawl including a section of rope having at least one eye of claim 7 wherein the process further comprises an additional step of forming into another part of the strength member core of the rope another eye.

9. The trawl including a section of rope having at least one eye of claim 8 wherein the process further comprises an additional step of passing a severed end of the braided sheath formed of the same strands that form the at least a portion of the braided sheath through the another eye, subsequently situating the at least a portion of the severed end of the braided sheath alongside a portion of the strength member core of the rope adjacent to the another eye and subsequently enclosing both the at least a portion of the severed end of the braided sheath and the at least a portion of the strength member core of the rope adjacent to the another eye within another portion of braided sheath that is formed of the same strands forming the at least a portion of the severed end of the braided sheath.

10. The trawl including a section of rope having at least one eye of claim 8 wherein the process further includes additional steps of:
    a) forming several sections of the rope having at least one eye by the process;
    b) forming at least a mesh portion of a trawl by interconnecting the several sections of rope having at least one eye formed by the process into a mesh arrangement so that the sections of rope formed by an eye form mesh bars of the trawl; whereby a trawl formed of mesh bars of mainly coverbraided rope is economically produced.

11. A process for forming a section of rope having at least one eye, the process including steps of providing a strength member core of a rope, the process comprising steps of:
    a) situating an object adjacent to at least a portion of the strength member core of the rope;
    b) subsequently covering at least portions of the combination of the at least a portion of the strength member core of the rope and the object with at least a portion of a braided sheath formed of strands;
    c) attaching to the object a portion of a structure formed of the same strands that form the at least a portion of the braided sheath; and
    d) subsequently removing the object from the at least a portion of the braided sheath so as to cause the portion of the structure attached to the object to be drawn into at least a portion of the space within the at least a portion of the braided sheath enclosing the at least a portion of the strength member core of the rope that was originally occupied by at least a portion of the object, whereby a mainly coverbraided section of rope is economically produced.

12. The process of claim 11 wherein prior to step (a) above the process further comprises an additional step of forming an eye in the at least a portion of the strength member core of the rope.

13. The process of claim 12 wherein the process further comprises an additional step of forming into another part of the strength member core of the rope another eye.

14. The process of claim 13 wherein the process further comprises an additional step of passing a severed end of the braided sheath formed of the same strands that form the at least a portion of the braided sheath through the another eye, subsequently situating the at least a portion of the severed end of the braided sheath alongside a portion of the strength member core of the rope adjacent to the another eye and subsequently enclosing both the at least a portion of the severed end of the braided sheath and the at least a portion of the strength member core of the rope adjacent to the another eye within another portion of braided sheath that is formed of the same strands forming the at least a portion of the severed end of the braided sheath.

15. The section of rope having at least one eye of claim 1, wherein the process further comprises an additional step of selecting to form the strength member core of the rope with a plastic core.

16. The section of rope having at least one eye of claim 15, wherein the process further comprises an additional step of selecting to form the strength member core of a material that is less elastic than material forming a spiraling strand included within the braided sheath formed of strands and where the spiraling strand is of larger diameter than other strands forming the braided sheath.

17. The section of rope having at least one eye of claim 1, wherein the process further comprises an additional step of selecting to form the braided sheath formed of strands with a spiraling strand that is of larger diameter than other strands forming the braided sheath.

18. A process for forming a trawl that includes a section of rope having at least one eye, the rope formed by a process that includes steps of providing a strength member core of a rope, the process comprising steps of:
    a) situating an object adjacent to at least a portion of the strength member core of the rope;
    b) subsequently covering at least portions of the combination of the at least a portion of the strength member core of the rope and the object with at least a portion of a braided sheath formed of strands;
    c) attaching to the object a portion of a structure formed of the same strands that form the at least a portion of the braided sheath; and
    d) subsequently removing the object from the at least a portion of the braided sheath so as to cause the portion of the structure attached to the object to be drawn into at least a portion of the space within the at least a portion of the braided sheath enclosing the at least a portion of the strength member core of the rope that was originally occupied by at least a portion of the object, whereby a mainly coverbraided section of rope is economically produced.

19. The section of rope having at least one eye of claim 1 further comprising prior to step (b) an additional step of forming an eye in the at least a portion of the strength member core of the rope.

20. The section of rope having at least one eye of claim 1 wherein step (b) further comprises selecting to include within and among the strands (397) forming the braided sheath at least one additional strand (36) that is larger in diameter than the strands (397) forming the braided sheath.

21. The section of rope having at least one eye of claim 1 further comprising selecting to situate mainly about the outside of the braided sheath at least one additional strand (36) that is larger in diameter than the strands (397) forming the braided sheath.

22. The section of rope having at least one eye of claim 21 further comprising selecting to adhere the at least one additional strand (36) mainly to the outside of the braided sheath.

23. The section of rope having at least one eye of claim 21 further comprising selecting for the at least one additional strand (36) a strand that is more elastic than the strands (397) forming the braided sheath.

24. The section of rope having at least one eye of claim 22 further comprising selecting for the at least one additional strand (36) a strand that is more elastic than the strands (397) forming the braided sheath.

25. The trawl including the section of rope having at least one eye of claim 6 wherein step (b) further comprises selecting to include within and among the strands (397) forming the braided sheath at least one additional strand (36) that is larger in diameter than the strands (397) forming the braided sheath.

26. The trawl including the section of rope having at least one eye of claim 6 further comprising selecting to situated mainly about the outside of the braided sheath at least one additional strand (36) that is larger in diameter than the strands (397) forming the braided sheath.

27. The trawl including the section of rope having at least one eye of claim 26 further comprising selecting to adhere the at least one additional strand (36) mainly to the outside of the braided sheath.

28. The section of rope having at least one eye of claim 26 further comprising selecting for the at least one additional strand (36) a strand that is more elastic than the strands (397) forming the braided sheath.

29. The section of rope having at least one eye of claim 27 further comprising selecting for the at least one additional strand (36) a strand that is more elastic than the strands (397) forming the braided sheath.

30. The process of claim 11 wherein step (b) of claim 11 further comprises an additional step of selecting to include within and among the strands (397) forming the braided sheath at least one additional strand (36) that is larger in diameter than the strands (397) forming the braided sheath.

31. The process of claim 11 further comprising an additional step of selecting to situate mainly about the outside of the braided sheath at least one additional strand (36) that is larger in diameter than the strands (397) forming the braided sheath.

32. The process of claim 31 further comprising an additional step of selecting to adhere the at least one additional strand (36) mainly to the outside of the braided sheath.

33. The process of claim 31 further comprising an additional step of selecting for the at least one additional strand (36) a strand that is more elastic than the strands (397) forming the braided sheath.

34. The process of claim 32 further comprising an additional step of selecting for the at least one additional strand (36) a strand that is more elastic than the strands (397) forming the braided sheath.

* * * * *